United States Patent [19]

Kido

[11] Patent Number: 4,864,213
[45] Date of Patent: Sep. 5, 1989

[54] DC SUPPLY HAVING LOW AND HIGH CONSTANT VOLTAGES FOR POWERING A POLARITY INVERTER CONTROLLER

[75] Inventor: Tooru Kido, Tokyo, Japan
[73] Assignee: NEC Corporation, Tokyo, Japan
[21] Appl. No.: 282,427
[22] Filed: Dec. 12, 1988
[30] Foreign Application Priority Data Dec. 11, 1987 [JP] Japan ................................. 62-312207
Dec. 26, 1987 [JP] Japan ................................. 62-328302

[51] Int. Cl.$^4$ ........................ H02M 3/156; G05F 5/08
[52] U.S. Cl. ................................. 323/222; 323/270; 323/299; 323/901
[58] Field of Search ................... 363/49, 89; 323/222, 323/270, 284, 285, 299, 901; 307/296 A

[56] References Cited

U.S. PATENT DOCUMENTS 3,049,623  8/1962  Du Vall ............................. 323/270
4,351,021  9/1982  Morihisa et al. ..................... 363/49

FOREIGN PATENT DOCUMENTS 172972  10/1983  Japan .................................. 363/49
293159  12/1986  Japan .

OTHER PUBLICATIONS

Chetty, "IC Times Control DC-DC Converters", Electronics, Nov. 13, 1975, pp. 121, 122, (323/222).

Primary Examiner—William H. Beha, Jr.
Attorney, Agent, or Firm—Sughrue, Mion, Zinn, Macpeak & Seas

[57] ABSTRACT

A power supply comprises an inverter circuit for converting an input voltage from a d.c. voltage source to a desired output voltage which is maintained constant under varying current of a load circuit through the feedback operation of an inverter controller. A threshold circuit including a breakdown diode is connected to the d.c. voltage source. The base of a voltage sensing transistor is connected to the breakdown diode for switching to a conducting state when the d.c. voltage exceeds a prescribed level determined by threshold voltages of the breakdown diode and the voltage sensing transistor. A pair of current carrying transistors are connected between the d.c. voltage source and a power supply terminal of the inverter controller. Responsive to the condition of the voltage sensing transistor current is supplied through the current carrying transistors from the d.c. voltage source to the inverter controller. The source voltage supplied to the inverter controller is held at zero volt until the d.c. input voltage rises above the prescribed level and jumps to a high level which is maintained constant by a semiconductor circuit comprising the breakdown diode, the voltage sensing transistor and the current carrying transistors.

8 Claims, 3 Drawing Sheets

DC SUPPLY HAVING LOW AND HIGH CONSTANT VOLTAGES FOR POWERING A POLARITY INVERTER CONTROLLER

BACKGROUND OF THE INVENTION

The present invention relates generally to power supplies, and more particularly to a voltage stabilizer for an inverter control circuit.

The switching regulator includes a solid-state inverter for converting a d.c. voltage to a high-frequency voltage and a rectifier/filter circuit that converts the high-frequency voltage to a desired d.c. voltage for delivery to a load circuit. The inverter comprises a semiconductor switching device that chops the input d.c. voltage in response to a firing pulse applied thereto to cause a high frequency current to be generated in an LC resonant circuit. The firing pulse is generated by an inverter controller which is implemented by an integrated circuit. To maintain the d.c. output voltage at a desired level, the inverter controller compares it with a reference voltage to detect the difference between them and controls the duration, or duty cycle of the firing pulse in accordance with the detected difference through a feedback loop. Because of the feedback operation, the initial low output voltage, which is generated immediately following the turn-on of power switch, causes an excess input d.c. current. To avoid the excess input current, a voltage controller as shown in FIG. 1A is provided. The d.c. input voltage $V_i$ is applied across a Zener diode 4 and a resistor 5. Transistor 1 remains nonconductive, and hence the output voltage is zero when the voltage across the Zener diode 4 is lower than a breakdown voltage $V_z$. When the input voltage $V_i$ becomes equal to a threshold value $V_z + V_{BE}$ (where $V_{BE}$ is the base-emitter voltage of the transistor 1), current begins flowing through diode 4 and resistor 3 from the base of transistor 1, causing it to conduct to produce an output voltage $V_o$, as shown in FIG. 1B, for delivery to the IC feedback circuit as well as to the inverter. A resistor 2 is connected across the base and emitter of transistor 1 to allow leakage current of transistor 1 to pass through it. Being represented by the relation $V_i - V_{CE}$ (where $V_{CE}$ is the collector voltage of transistor 1), the output voltage $V_o$ increases linearly with input voltage $V_i$ after the latter exceeds beyond the threshold value $V_Z + V_{BE}$. Therefore, provision must be made to prevent the d.c. output voltage from exceeding the rated power supply voltage of the IC chip. A voltage controller shown in FIG. 2A has been developed to overcome the disadvantage of the controller of FIG. 1A. With this controller, the base of a transistor 6 is connected to a junction between a Zener diode 8 and a resistor 7 across which the d.c. input voltage $V_i$ is applied. Resistor 7 serves as a bypass path for the leakage current of the transistor 6. When the input voltage $V_i$ is lower than the breakdown voltage $V_z$ of the Zener diode 8, d.c. output voltage $V_o$ developed at the emitter of transistor 6 increases linearly as shown in FIG. 2B. After the d.c. input voltage reaches $V_z$, the d.c. output voltage $V_o$ is maintained constant at a voltage $V_z - V_{BE}$, where $V_{BE}$ is the base-emitter voltage of the transistor 6. Although the output voltage can be maintained constant after a threshold is reached, the generation of the initial output voltage for low input voltages is disadvantage for application to switching regulators.

SUMMARY OF THE INVENTION

It is therefore an object of the present invention to provide a power supply which combines the advantages of prior art techniques while eliminating their disadvantages.

The power supply of the present invention comprises an inverter circuit for converting an input voltage from a d.c. voltage source to a desired output voltage by chopping the input voltage at a predetermined frequency and supplying the output voltage to a load circuit. The inverter is controlled in accordance with the output voltage by a controller so that it keeps a desired level under varying current of the load circuit. A threshold circuit including a breakdown diode is connected between the terminals of the d.c. voltage source. A transistor of a voltage sensing circuit has a base connected to the breakdown diode for switching to a conducting state when the d.c. voltage exceeds a prescribed level determined by threshold voltages of the breakdown diode and the transistor. A current carrying circuit including a pair of transistors is connected between the d.c. voltage source and a power supply terminal of the inverter controller. The transistors of the current carrying circuit are responsive to the switching of the transistor of the voltage sensing circuit for carrying current from the d.c. voltage source to the power supply terminal of the inverter controller to develop a voltage which is substantially determined by threshold voltages of the breakdown diode and the transistor of the voltage sensing circuit and one of the transistors of the current carrying circuit. Thus, the power supply terminal of the inverter controller is held at a zero voltage level until the d.c. input voltage rises above the prescribed level, whereupon it jumps to a high voltage level which is kept constant by the breakdown diode, the transistor of the voltage sensing circuit and the transistors of the current carrying circuit.

In a preferred embodiment of the present invention, the power supply includes a hysteresis circuit for supplying current to the base of the voltage sensing transistor when the d.c. input voltage lies between a higher prescribed level and a lower prescribed level. This hysteresis circuit prevents oscillation of the d.c. output voltage supplied to the inverter controller between zero and high voltage levels which might otherwise be caused by a fluctuation of the d.c. input voltage about the higher prescribed level.

BRIEF DESCRIPTION OF THE DRAWINGS

The present invention will be described in further detail with reference to the accompanying drawings, in which.

DETAILED DESCRIPTION

Figure 1A:
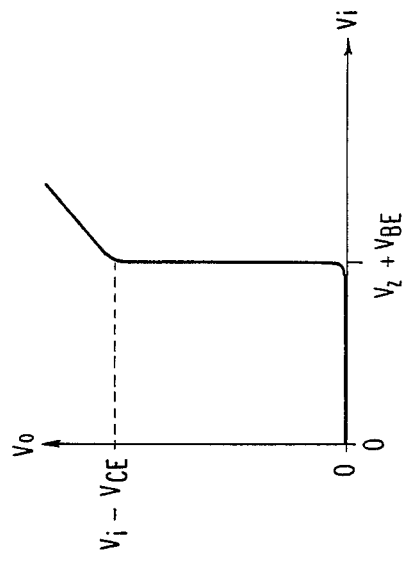
FIG. 1A is a circuit diagram of a prior art voltage controller for a switching regulator.
Figure 1B:
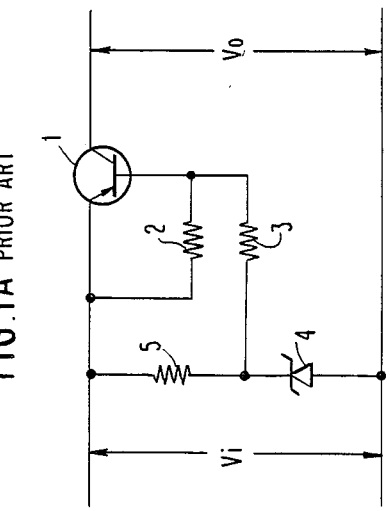
FIG. 1B is a graphic illustration of the operating characteristic of the circuit of FIG. 1A.
Figure 2A:
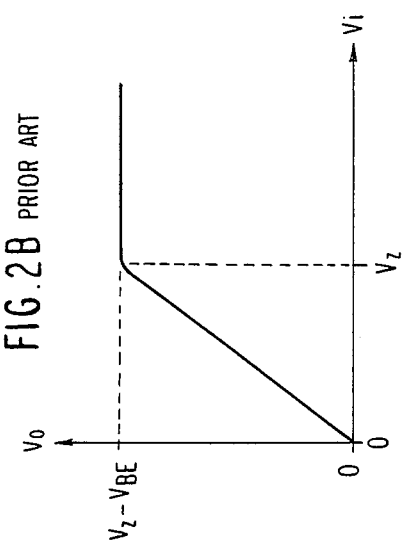
FIG. 2A is a circuit diagram of another prior art voltage controller.
Figure 2B:
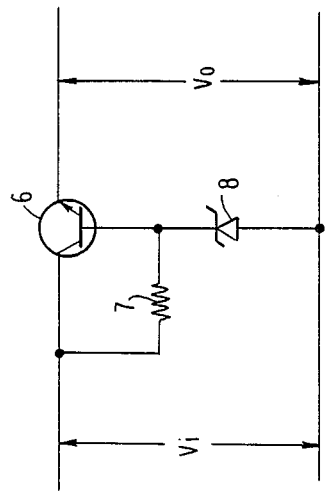
FIG. 2B is a graphic illustration of the operating characteristic of the circuit of FIG. 2A.
Figure 3:
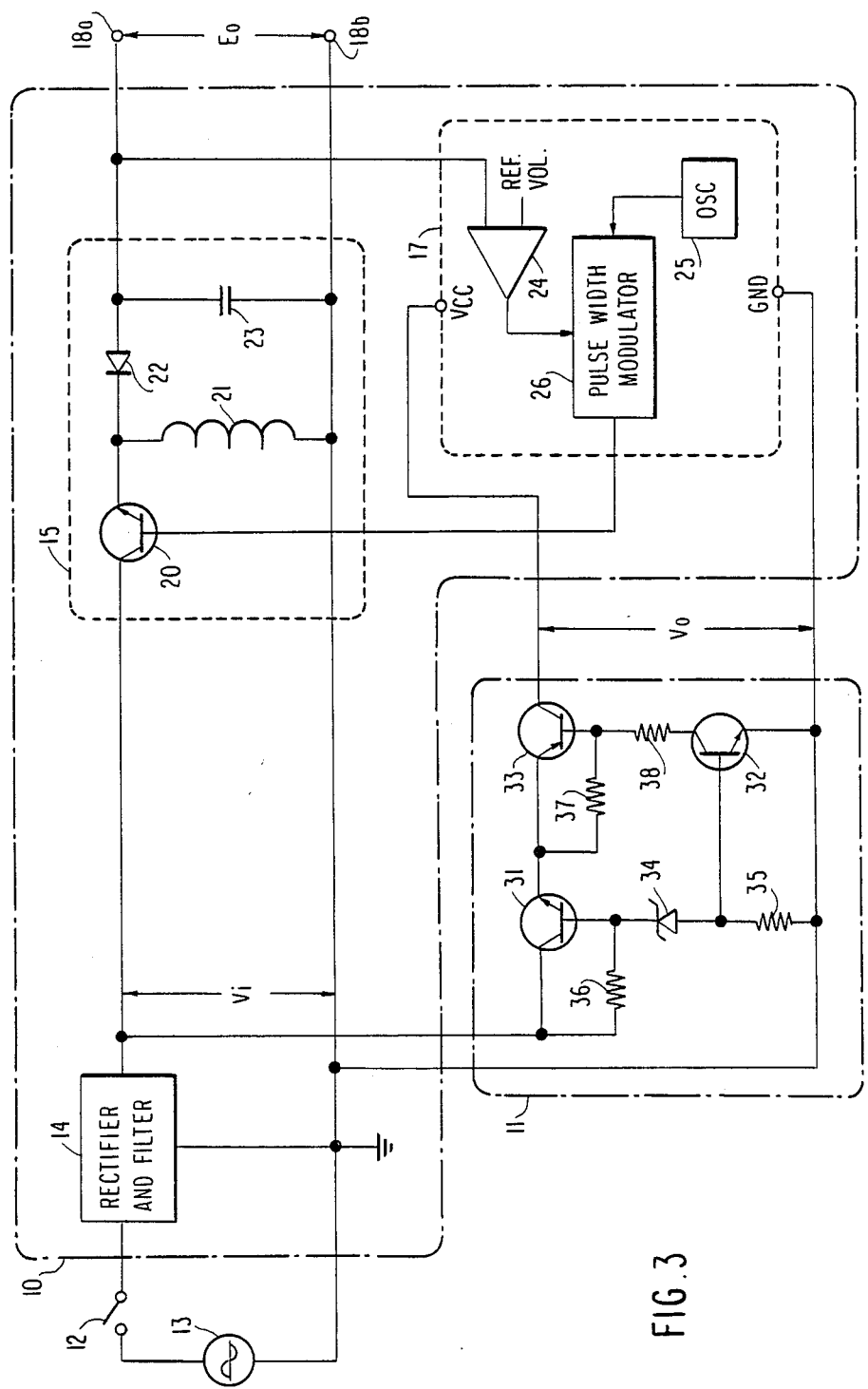
FIG. 3 is a circuit diagram of a power supply according to a first embodiment of the present invention.

Referring now to FIG. 3, there is shown a power supply according to a first embodiment of the present invention. The power supply generally comprises a switching regulator 10 which receives low frequency energy from an a.c. power source 13 through a power switch 12 and a voltage controller 11. Switching regulator 10 comprises a rectifier and filter circuit 14 which converts the a.c. source voltage into a d.c. voltage $V_i$ which is applied to an inverter 15 and the voltage controller 11. Inverter 15 includes a switching transistor 20 which responds to a firing pulse from an integrated circuit inverter controller 17 by chopping the d.c. voltage $V_i$ to cause a current to flow through a coil 21. When transistor 20 is turned off, a diode 22 becomes conductive, causing a current to flow through a capacitor 23 to complete an oscillation. The process is repeated by the application of successive firing pulses from the inverter controller 17 so that the d.c. voltage $V_i$ is converted to a desired output voltage $E_o$ which appears across output terminals 18a and 18b. The output terminal 18a is connected to one input of a comparator 24 of inverter controller 17 for making a comparison between the d.c. output voltage $E_o$ and a reference voltage to supply an output representing the difference between them to a pulse width modulator 26 to provide pulse-width modulation on the output of an oscillator 25. The output of the pulse width modulator 26 is supplied to the base of transistor 20 to chop the d.c. input to generate the high frequency voltage. The reference voltage of comparator 24 represents a desired output voltage of the switching regulator 10. By the feedback operation, the difference between the output voltage $E_o$ and the reference voltage reduces to zero and through this process the energy injected to the LC circuit of the inverter 15 is proportionally controlled to meet the amount of load current drained by a load circuit connected across the terminals 18a and 18b, so that the output voltage $E_o$ is maintained at the desired value under varying load current.

Voltage controller 11 comprises a first, NPN transistor 31 having a collector connected to the positive output terminal of rectifier and filter circuit 14 and connected to its base through a resistor 36. To the base of transistor 31 is connected the cathode of a Zener diode 34 whose anode is connected by a resistor 35 to ground, or negative output terminal of the rectifier and filter circuit 14. The junction between Zener diode 34 and resistor 35 is connected to the base of a second, NPN transistor 32 whose emitter is connected to ground and whose collector is connected by a resistor 38 to the base of a third, PNP transistor 33. The emitter of the third transistor 33 is connected to the emitter of the first transistor 31 and further to its base through a resistor 37. A d.c. output voltage $V_o$ is developed across the collector of the third transistor 33 and ground and applied as a source voltage across the Vcc and ground terminals of the integrated circuit inverter controller 17.

Figure 4:
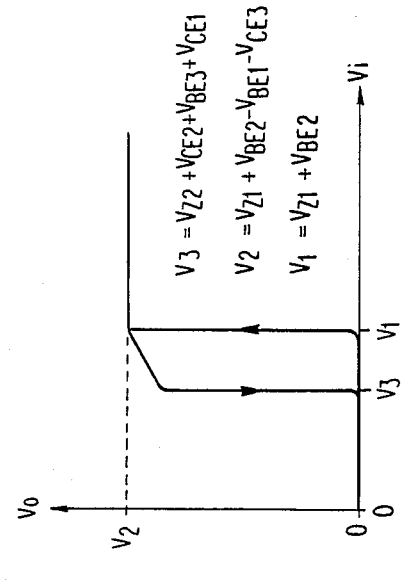
FIG. 4 is a graphic illustration of the operating characteristic of the first embodiment.

The operation of the voltage controller 11 will be given below with reference to FIG. 4.

When the d.c. input voltage $V_i$ is lower than a threshold voltage $V_1 = V_{z1} + V_{BE2}$ (where $V_{z1}$ and $V_{BE2}$ represent the breakdown voltage of Zener diode 34 and the base-emitter voltage of the second transistor 32, respectively), no current flows into the base of the second transistor 32. Thus, the second and third transistors 32 and 33 remain nonconductive and the output voltage $V_o$ is kept at a zero volt level. At the instant the d.c. input voltage $V_i$ exceeds the threshold voltage $V_1$, a current flows into the base of the second transistor 32, causing it to conduct and a current to flow from the base of the third transistor 33 through resistor 38. Hence, the first and third transistors 31 and 33 are turned on. When this occurs, the potential at the emitter of the first transistor 31 is clamped at a voltage equal to $V_{z1} + V_{BE2} - V_{BE1}$, where $V_{BE1}$ represents the voltage drop across the base and emitter of the first transistor 31. Therefore, the output voltage $V_o$ is maintained at a constant voltage $V_2$ which is given by $V_{z1} + V_{BE2} - V_{BE1} - V_{CE3}$, where $V_{CE3}$ represents the voltage drop across the collector and emitter of the third transistor 33.

It is seen that by keeping the output voltage $V_o$ at zero before the d.c. input voltage reaches a prescribed level and keeping it at a constant high level upon exceedance of the prescribed level, there is no excessive input current flow into the switching regulator 10 upon turn-on of the power switch 12 and the source voltage of the inverter controller 17 is maintained within the allowable range of integrated circuit chips.

Figure 5:
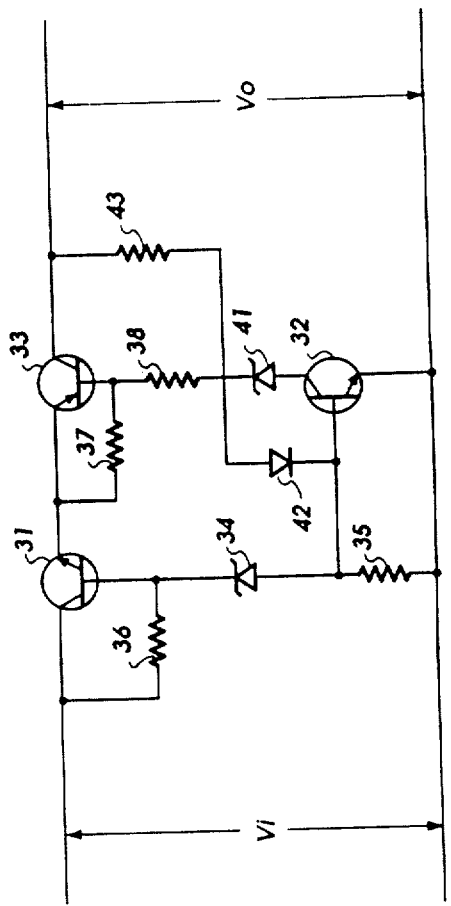
FIG. 5 is a circuit diagram of a voltage controller according to a second embodiment of the present invention.

A modified embodiment of the present invention is shown in FIG. 5 in which parts corresponding to those in FIG. 3 are marked with the same numerals as used in FIG. 3. The modified voltage controller additionally includes a second Zener diode 41 connected between the collector of the second transistor 32 and the resistor 38 and a series circuit comprising a diode 42 and a resistor 43 connected between the base of the second transistor 32 and the collector of the third transistor 33. The circuit of FIG. 5 operates exactly the same as the circuit of FIG. 3 when the d.c. input voltage $V_i$ starts increasing from zero to the threshold voltage $V_1$.

Because of the range of tolerances in which the mains a.c. voltage of the source 13 varies, the d.c. output of the rectifier and filter circuit 14 contains a ripple component. Such a ripple component would otherwise cause sharp changes in the output voltage $V_o$ between zero and $V_2$ in the case of FIG. 3. However, in the circuit of FIG. 5, a voltage drop in the d.c. input voltage $V_i$ from the threshold $V_1$ causes the base current of the second transistor 32 that has been supplied through the junction between Zener diode 34 and resistor 35 to cease and turns on diode 42. The source of this base current is now switched to the output circuit of the voltage controller, so that the base current is supplied from the collector of the third transistor 33 through resistor 43 and the now conducting diode 42. Thus, the second transistor 32 remains in the conductive state even though the d.c. input voltage falls below the threshold $V_1$. The base current of the second transistor 32 through resistor 43 and diode 42 continues to flow until the d.c. input voltage $V_i$ falls below a threshold voltage $V_3$ which is given by the relation $V_{z2} + V_{CE2} + V_{BE3} + V_{CE1}$, where $V_{z2}$ represents the breakdown voltage of Zener diode 41, $V_{CE2}$ represents the collector-emitter voltage of the second transistor 32, $V_{BE3}$, the voltage drop across the base and emitter of the third transistor 33 and $V_{CE1}$, the voltage drop across the collector and emitter of the first transistor 31. When the d.c. input voltage Vi falls below the lower threshold $V_3$, no current flows into the base of the third transistor 33, causing it to turn off to reduce the output voltage $V_o$ to zero. While the d.c. output voltage $V_o$ may decrease with the d.c. input voltage $V_i$ until the latter falls below the lower threshold $V_3$ (see FIG. 6), it is still within the tolerance range of the integrated circuit chip. Because of the hysteresis, the output voltage $V_o$ is prevented from switching between zero and $V_2$ levels under the influence of a ripple component.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A power supply comprising:
    inverter means for converting an input voltage from a d.c. voltage source to an output voltage by chopping said input voltage at a predetermined frequency and supplying said output voltage to a load circuit;
    inverter control means for causing said inverter means to chop said input voltage in accordance with said output voltage so that said output voltage is maintained at a desired level under varying current of said load circuit;
    threshold means including a breakdown diode connected between first and second terminals of said d.c. voltage source;
    voltage sensing means including a transistor having a base connected to said breakdown diode for switching from a nonconducting state to a conducting state when said d.c. voltage exceeds a prescribed level determined by threshold voltages of said breakdown diode and said transistor; and
    current carrying means including a pair of transistors connected in series between said first terminal of said d.c. voltage source and a power supply terminal of said inverter control means, the transistors of said current carrying means being responsive to the switching of the transistor of said voltage sensing means to said conducting state for carrying current from said first terminal of said d.c. voltage source to said power supply terminal and developing at said power supply terminal a voltage which is substantially determined by threshold voltages of said breakdown diode and the transistor of said voltage sensing means and one of the transistors of said current carrying means.

2. A power supply as claimed in claim 1, wherein the transistors of said current carrying means are of opposite conductivity type and have bases connected together.

3. A power supply as claimed in claim 1, further comprising hysteresis means for supplying current to the base of the transistor of said voltage sensing means when said d.c. input voltage lies between the firstmentioned prescribed level and a second prescribed level lower than said first prescribed level.

4. A power supply as claimed in claim 3, wherein said hysteresis means comprises a unidirectional circuit connected between said power supply terminal of said inverter control means and the base of the transistor of said voltage sensing means and a second breakdown diode connected between the transistor of said voltage sensing means and the other transistor of said current carrying means.

5. A power supply comprising:
    inverter means for converting an input voltage from a d.c. voltage source to an output voltage by chopping said input voltage at a predetermined frequency and supplying said output voltage to a load circuit;
    inverter control means for causing said inverter means to chop said input voltage in accordance with said output voltage so that said output voltage is maintained at a desired level under varying current of said load circuit;
    first, second, third and fourth resistors;
    a breakdown diode having a cathode connected through said first resistor to a negative terminal of said d.c. voltage source; and
    first, second and third transistors, each of said transistors having a base and first and second controlled electrodes,
    the base of said first transistor being connected to the anode of said breakdown diode, the first controlled electrode of said first transistor being connected to a positive terminal of said d.c. voltage source and further connected to the base of said first transistor through said second resistor, and the second controlled electrode of said first transistor being connected to the second controlled electrode of said third transistor,
    the base of said second transistor being connected to the anode of said breakdown diode, the first controlled electrode of said second transistor being connected through said third resistor to the base of said third transistor, and the second controlled electrode of said second transistor being connected to said negative terminal of said d.c. voltage source and further connected to a negative voltage supply terminal of said inverter control means, and
    the base and second controlled electrode of said third transistor being connected through said fourth resistor, and the first controlled electrode of said third transistor being connected to a positive voltage supply terminal of said inverter control means.

6. A power supply as claimed in claim 5, wherein said third transistor has a conductivity type opposite to the conductivity type of said first and transistors, and wherein said first and second controlled electrodes of said first, second and third transistors are collector and emitter, respectively.

7. A power supply as claimed in claim 5, further comprising a hysteresis circuit for supplying current to the base of said second transistor when said d.c. input voltage lies between a first level determined by the threshold voltages of said breakdown diode and said second transistor and a second level lower than said first level.

8. A power supply as claimed in claim 7, wherein said hysteresis means comprises a unidirectional circuit connected between said positive voltage supply terminal of said inverter control means and the base of said second transistor and a second breakdown diode connected between the first controlled electrode of said second transistor and the base of said third transistor in series with said third resistor.

* * * * *

UNITED STATES PATENT AND TRADEMARK OFFICE
CERTIFICATE OF CORRECTION

PATENT NO. : 4,864,213

DATED : September 5, 1989

INVENTOR(S) : Tooru Kido

It is certified that error appears in the above-identified patent and that said Letters Patent is hereby corrected as shown below:

ON TITLE PAGE:

IN THE TITLE, please delete "A POLARITY" and insert --AN--.

Figure 6:
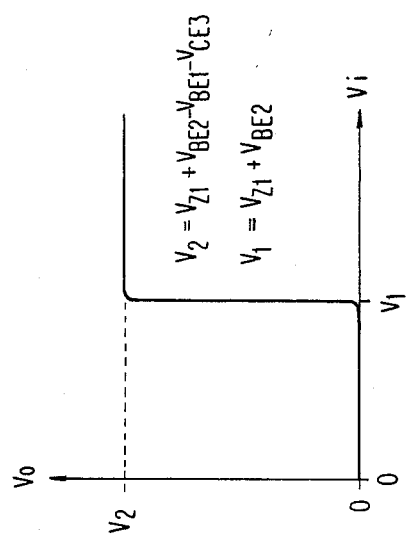
FIG. 6 is a graphic illustration of the operating characteristic of the second embodiment.
Figure 6:
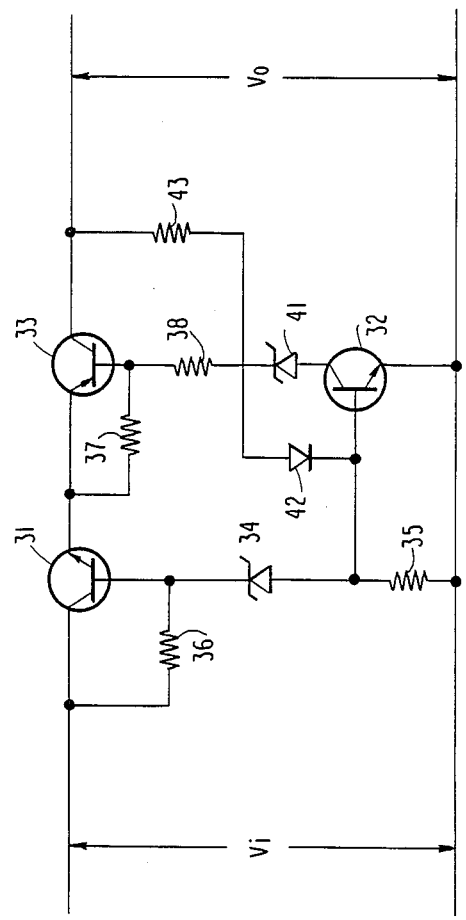
Figure 6:
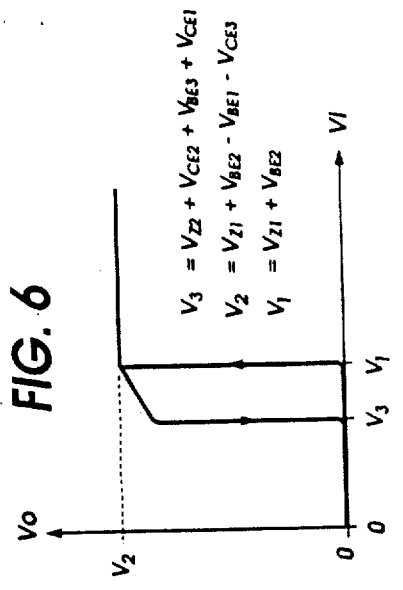
Figure 4:
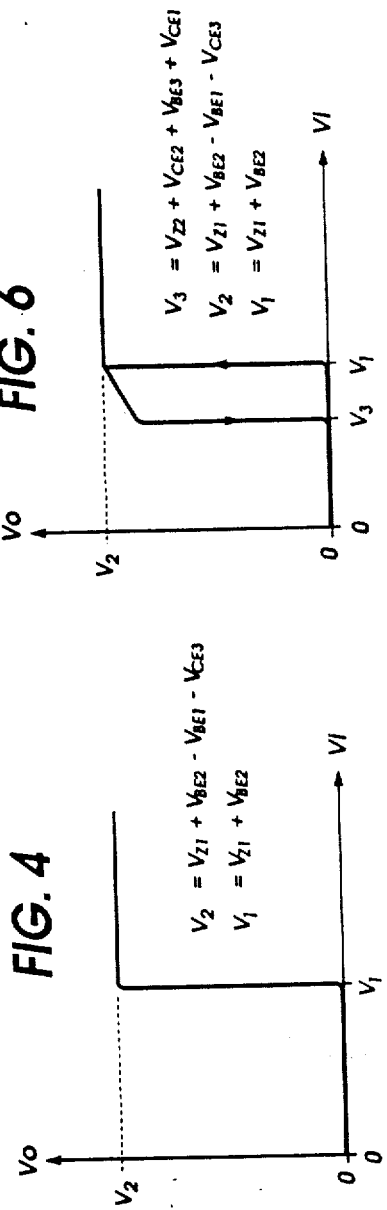

IN THE FIGURES, on Sheet 3 of 3, please change the Figure notation for the circuit labelled "FIG. 6" to --FIG. 5-- as shown on the attached sheet.

Signed and Sealed this

Thirty-first Day of December, 1991

Attest:

HARRY F. MANBECK, JR.

*Attesting Officer*   Commissioner of Patents and Trademarks $V_3 = V_{Z2} + V_{CE2} + V_{BE3} + V_{CE1}$
$V_2 = V_{Z1} + V_{BE2} - V_{BE1} - V_{CE3}$
$V_1 = V_{Z1} + V_{BE2}$ $V_2 = V_{Z1} + V_{BE2} - V_{BE1} - V_{CE3}$
$V_1 = V_{Z1} + V_{BE2}$